US006572999B1

United States Patent
Stocchiero

(10) Patent No.: US 6,572,999 B1
(45) Date of Patent: Jun. 3, 2003

(54) CONTAINER FOR BATTERIES WITH WALLS GIVEN INCREASED RIGIDITY

(76) Inventor: Olimpio Stocchiero, Via Kennedy, 5, Montorso Vicentino (VI), 36050 (IT)

(*) Notice: Subject to any disclaimer, the term of this patent is extended or adjusted under 35 U.S.C. 154(b) by 0 days.

(21) Appl. No.: 09/536,725

(22) Filed: Mar. 28, 2000

(30) Foreign Application Priority Data

Apr. 1, 1999 (IT) .......................................... VI990027 U

(51) Int. Cl.⁷ .......................... H01M 2/04; H01M 2/00
(52) U.S. Cl. ...................... 429/176; 429/175; 523/134
(58) Field of Search ................................. 429/176, 175, 429/163, 149, 156, 120, 153, 154, 178; 523/134

(56) References Cited

U.S. PATENT DOCUMENTS 4,118,265 A   10/1978  Hardigg
5,492,779 A * 2/1996  Ronning ..................... 429/120
5,885,732 A * 3/1999  Verhog ....................... 429/176
6,007,937 A * 12/1999 Ruiz Rodriguez et al. .... 429/94
6,255,015 B1 * 7/2001 Corrigan et al. ............ 429/149

FOREIGN PATENT DOCUMENTS

| EP | 0 874 408 A1 | 10/1998 |
| JP | 62071165 | 4/1987 |
| JP | 62071166 | 4/1987 |
| JP | 08329973 | 12/1996 |
| JP | 09306437 | 11/1997 |

* cited by examiner

Primary Examiner—Stephen Kalafut
Assistant Examiner—R Alejandro
(74) Attorney, Agent, or Firm—Dykema Gossett, PLLC

(57) ABSTRACT

The finding produces a container for batteries comprising an open, prism-shaped case, with its inside having a series of vertical baffles suited to creating chambers for the cells of said battery and having a watertight cover coupled to it, which holds the battery terminals, where at least the case of said container is made by moulding propylene-bonded mica in granular powder, said addition of powder being in the region of 5–50% by weight.

6 Claims, 3 Drawing Sheets

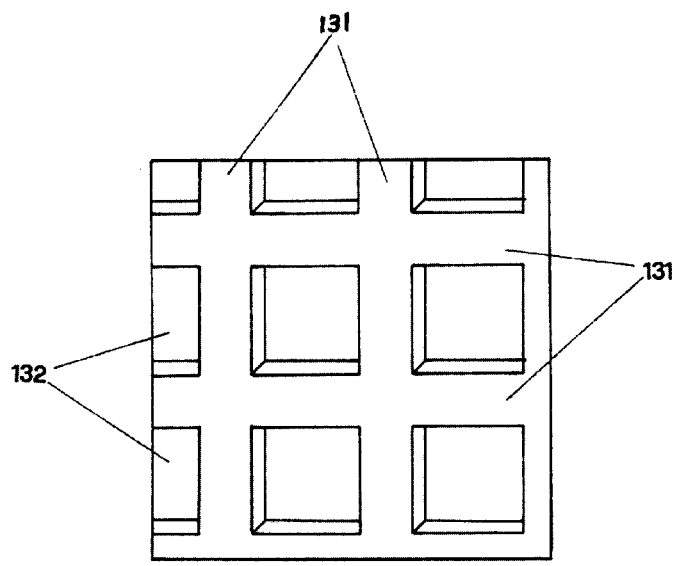
FIG. 3
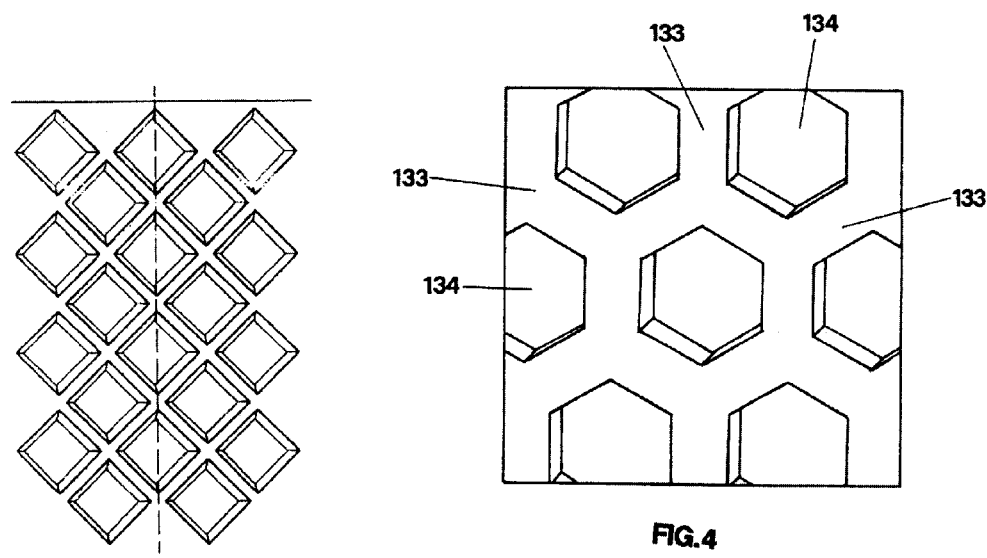
FIG. 5
FIG. 4

CONTAINER FOR BATTERIES WITH WALLS GIVEN INCREASED RIGIDITY

The finding concerns a container especially suited for electric "recombination" type batteries but not solely limited to these.

It is known that "recombination" batteries are special batteries where the electrolyte cannot be identified as a liquid separated from the other components making up the battery cells, but is a substance that impregnates a basically spongy material called a "separator" which is in close contact with a metal "matrix".

The chemical interaction between separator, made of suitable material and impregnated with electrolyte, and metal matrix, allow the passage of electric current.

Each battery cell consists of an alternating sequence of separators and matrices in close contact with each other.

Since the electrolyte is not liquid but rather impregnated in the separator, it is evident that the close contact between separator and matrix is an essential condition for achieving the ion exchange and subsequent "recombination" that gives rise to the rejoining of the original molecule and releasing of energy that is the basis of the battery's operation. As a consequence, to make sure that separators and matrices do not come apart, current technology houses each cell in a space enclosed by rigid walls suited to resisting even the internal pressure surges that may develop during the electrochemical reactions. The most common types of containers for recombination batteries essentially comprise an open case, with a basically parallelepiped form, and a cover hermetically coupled to the case along the outer rim and holding the battery terminals.

With the aforesaid scope of supporting internal surges in pressure, the inside volume of the battery case is partitioned by a series of rigid baffles, set vertically and parallel to one another, defining a sequence of chambers each of which designated to receive a battery cell.

What's more, current technology prescribes that the case containing the battery cells and the cover connected to it are constructed in high quality plastic, such as ABS, in order to guarantee an adequate rigidity and therefore a considerable resistance to deformation.

An additional inconvenience in known containers per recombination batteries is related to the transmission of heat out of the container. This heat transmission is particularly critical through the side faces of the case.

Normal kinds of acid batteries, such as for example automobile starter batteries, have containers made from moulded polypropylene. Although even these kinds of batteries have the problem of deformation in the walls, above all in the walls parallel to the baffles separating the various chambers. This problem is even more marked in batteries that are wider than average and with their walls parallel to the baffles being larger. In order to prevent too great a deformation, current technology prescribes the use of thicker polypropylene than required under normal conditions, with thicknesses even reaching up to 5 mm.

This finding intends to remedy the aforementioned inconveniences. Therefore the intention is to produce a container for batteries that has greater rigidity properties, with equal thickness, than known containers.

More specifically, concerning recombination batteries made of ABS, the intention is to produce a container made from moulded polypropylene with the addition of an appropriate reinforcement so that the rigidity properties of ABS are maintained.

On the other hand, with regards to batteries already produced in polypropylene, the intention is to limit deformation of containers to a minimum while still producing a container in polypropylene with sufficient reinforcement to increase its rigidity.

Another intended scope is to produce containers for normal or recombination type batteries that, even though they have greater material performances, maintain a low cost and ease of manufacture.

An additional scope of the finding is to increase the degree of efficiency in dissipating the heat produced internally by the battery cells.

All the aforementioned scopes and others that will be better explained below are achieved by a container for batteries that, in accordance with the contents of the main claim, comprises an open, prism-shaped case with its inside having a series of vertical baffles suited to creating chambers for the cells of said battery and having a watertight cover coupled to it, which holds the battery terminals, said container being characterised in that at least the case of said container is made from moulded polypropylene bonding mica in granular powder.

According to a preferred form of execution of the finding the mica bonding is made from crystals with particle sizes that vary from 0,5 to 100 μm.

An advantage of the finding is that the plastic-bonded mica, which is an Aluminium compound, significantly increases the case's rigidity preventing deformation of the walls parallel to the baffles, them being the weakest walls since they are not sustained by the baffles, as occurs in the opposite walls. Another advantage that is obtained from the use of plastic-bonded mica is excellent heat conductivity because the mica is a mixture of more or less complex aluminium compounds which, being finely dispersed throughout the polypropylene because of the fine particle size used, achieves excellent heat exchange taking the heat developed by the recombination battery from inside to outside the actual battery, which is essential to guaranteeing its good longterm operation.

With the material under this finding both cases and covers of the batteries can be moulded and all this can be done with the wall thickness being little more than normal batteries, but still keeping a clear cost advantage over the use of ABS.

It should also be said that the use of polypropylene-bonded mica, against ABS, simplifies the moulding operations since the same moulds suited to moulding batteries in normal polypropylene can be used, while containers in ABS for known types of recombination batteries require moulds of different technology to polypropylene injection. This is because ABS is a much more viscous material and therefore the equipment has to be adapted to this special material.

A variant in execution of the finding prescribes that the rigidity of polypropylene-bonded mica is combined with a special configuration of the walls parallel to the baffles of the battery case, making a series of protruding ribbing in these walls suited to reinforcing said case to counteract the pressure inside the actual container.

An advantage of this variant is that the protruding ribbing is set on the outside of said case and is preferably spaced apart and intersecting thereby defining a grid construction.

Other ways of producing the protruding ribbing prescribe forming a honeycomb type construction on the outside surfaces of the case with polygon-shaped pockets.

Other advantages and details of the container under this finding may be explained in the description of two preferred forms of execution given as a guideline but not a limitation and illustrated in the attached diagrams, where:

FIGS. 3 to 5 illustrate a front view in some different forms of execution of the protruding ribbing seen in FIG. 2.

Figure 1:
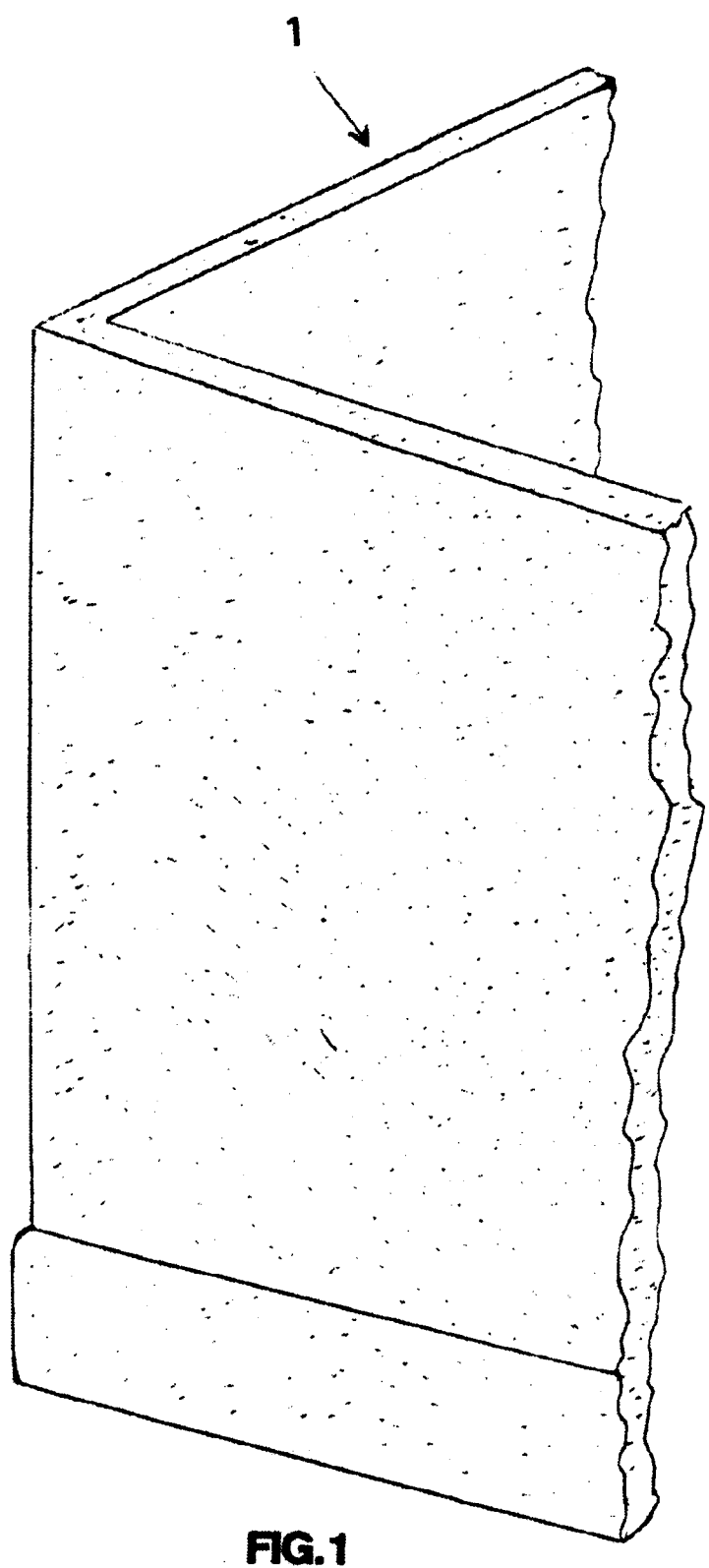
FIG. 1 shows part of the case of a recombination battery using polypropylene-bonded mica.

With reference to FIG. 1 it can be seen that a case for batteries, generally indicated by 1, is produced by moulding polypropylene-bonded mica that has a particle size which, in this specific example, is 30 μm. It is known that commercial mica is a mixture of aluminium silicates and alumina oxides. According to one form of execution of the finding, 20% by weight of mica is added to polypropylene.

However it has been seen that good results are obtained if the mica is kept between 5% to 50% by weight on the polypropylene.

With the material's properties and by effect of the mica a rigidity of the walls is obtained, which gives a considerable reduction in the deformation caused by the pressure of internal gases of recombination batteries, moreover the material's thermal conductivity is such that the heat generated internally is dissipated efficiently.

Figure 2:
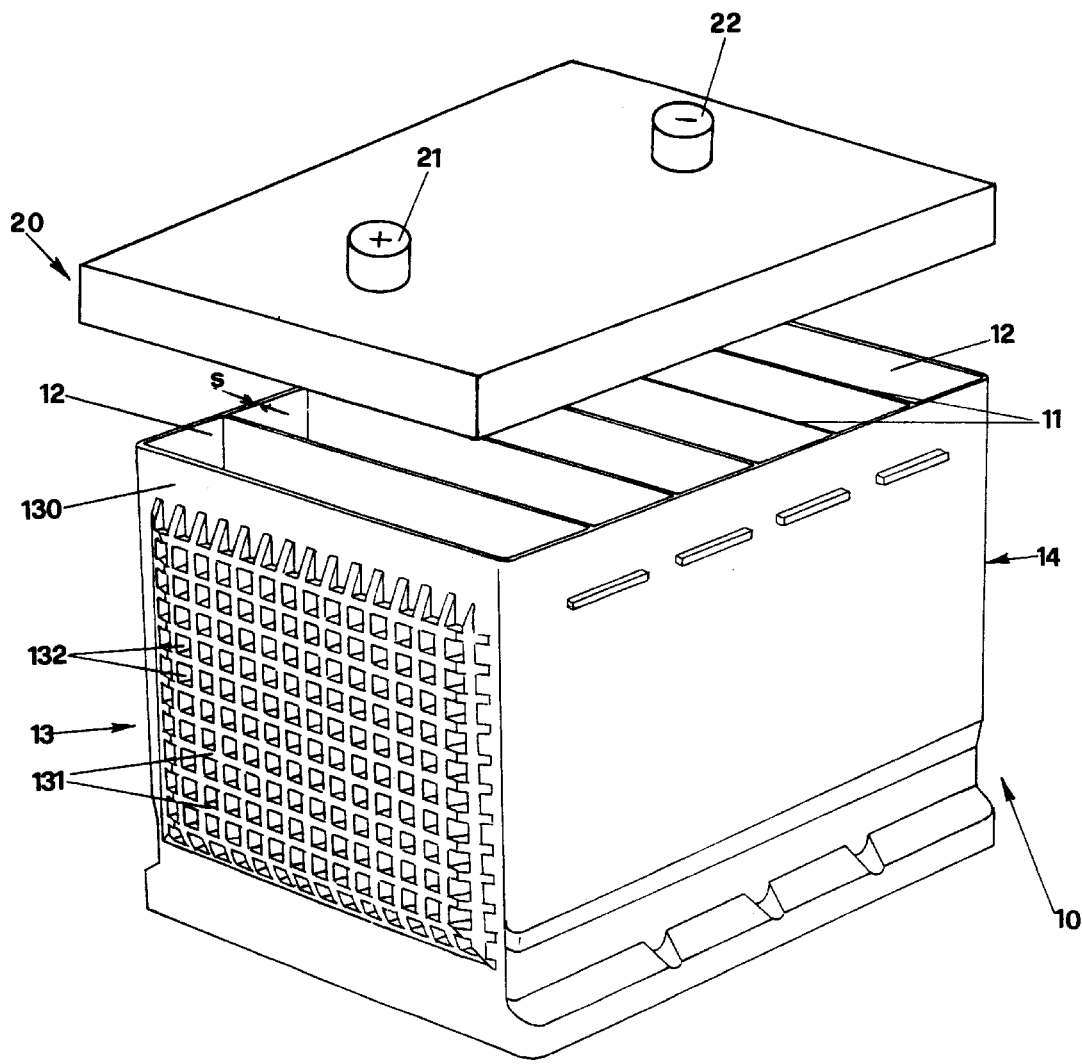
FIG. 2 illustrates a prospective view of a variant of the container case with ribbing on the two walls parallel to the baffles.

FIG. 2 shows a container for recombination batteries with an identical thickness to batteries produced in ABS. The container illustrated in FIG. 2 is also produced with the material under this finding and in other words polypropylene-bonded mica.

According to a variant in execution of the finding and with reference to FIG. 2, it can be seen that the container under this finding, as always made with polypropylene-bonded mica varying from 5 to 50% by weight, consists of a case, generally indicated by 10, and a cover, generally indicated by 20, which holds the positive 21 and negative 22 terminals of the electric battery being housed by the container.

The inside of the case 10 has a series of rigid, vertical baffles 11, which partition the case's inside volume into several chambers 12 basically all the same as each other, each of which is designated to receive a battery cell.

Since, in this example, the thickness of the case has been kept at known, normal levels, in order to strengthen the actual case against the action of the internal pressure that is produced inside the battery while it is in operation, the pair of opposing walls 13 and 14 (the latter hidden in FIG. 2) have a series of ribbing 131, protruding from the flat outside face 130 of wall 13 and intersecting, so that it creates a grid construction.

The execution in FIG. 2, where an enlarged detail is shown in FIG. 3, the protruding ribbing 131 is uniformly spaced and intersects perpendicularly, therefore the aforesaid grid construction has square-shaped cavities 132.

FIG. 4 shows an enlarged detail of a variant in execution of walls 13 and 14 of the container under this finding, which has protruding ribbing 133 that defines a honeycomb construction with hexagon-shaped pockets 134.

FIG. 5 shows an additional variant in execution of walls 13 and 14. It is very clear that the aforesaid grid and honeycomb constructions, illustrated as typical examples in the diagrams, may have any polygon-shaped cavities or pockets whatsoever, nevertheless achieving the set scope of strengthening the walls of the case, in particular those parallel to the baffles inside the actual case.

Said walls thus strengthened thereby allows the container to be made merely with lower cost plastics, such as for example, polypropylene.

The protruding ribbing also satisfies the additional scope of increasing the efficiency of dissipation of the heat produced within the battery, through the surfaces of the case that comprise the actual ribbing, each surface in effect becoming a radiator, in a monoblock with the surface itself.

The greater efficiency in dissipating the heat produced during the battery's operation allows a better operation of the battery itself.

What is claimed is:

1. A container for batteries comprising:

an open, prism-shaped case having an open top and interior;

a series of vertical baffles located in the interior of the case forming chambers defining cells of said battery;

a pair of opposing walls disposed generally parallel to said baffles, each opposing wall including a series of protruding ribbing for strengthening said case to counteract the pressure inside said container; and a watertight cover secured to the top of said cover for holding battery terminals, wherein the case is formed by moulding a mixture of propylene and mica in granular powder, said powder being in a range of about 5–50% by weight, whereby heat is dissipated through said case.

2. A container for batteries according to claim 1 wherein the mica granular powder has a particle size in a range of 0.5 to about 100 μm.

3. A container according to claim 1 wherein said protruding ribs are located on an exterior of said case.

4. A container according to claim 1 wherein said ribs include intersecting portions defining a grid construction.

5. A container according to claim 1 wherein said ribs are parallel and spaced apart.

6. A container according to claim 1 wherein said ribs define a honeycomb construction.

* * * * *